1,718,675

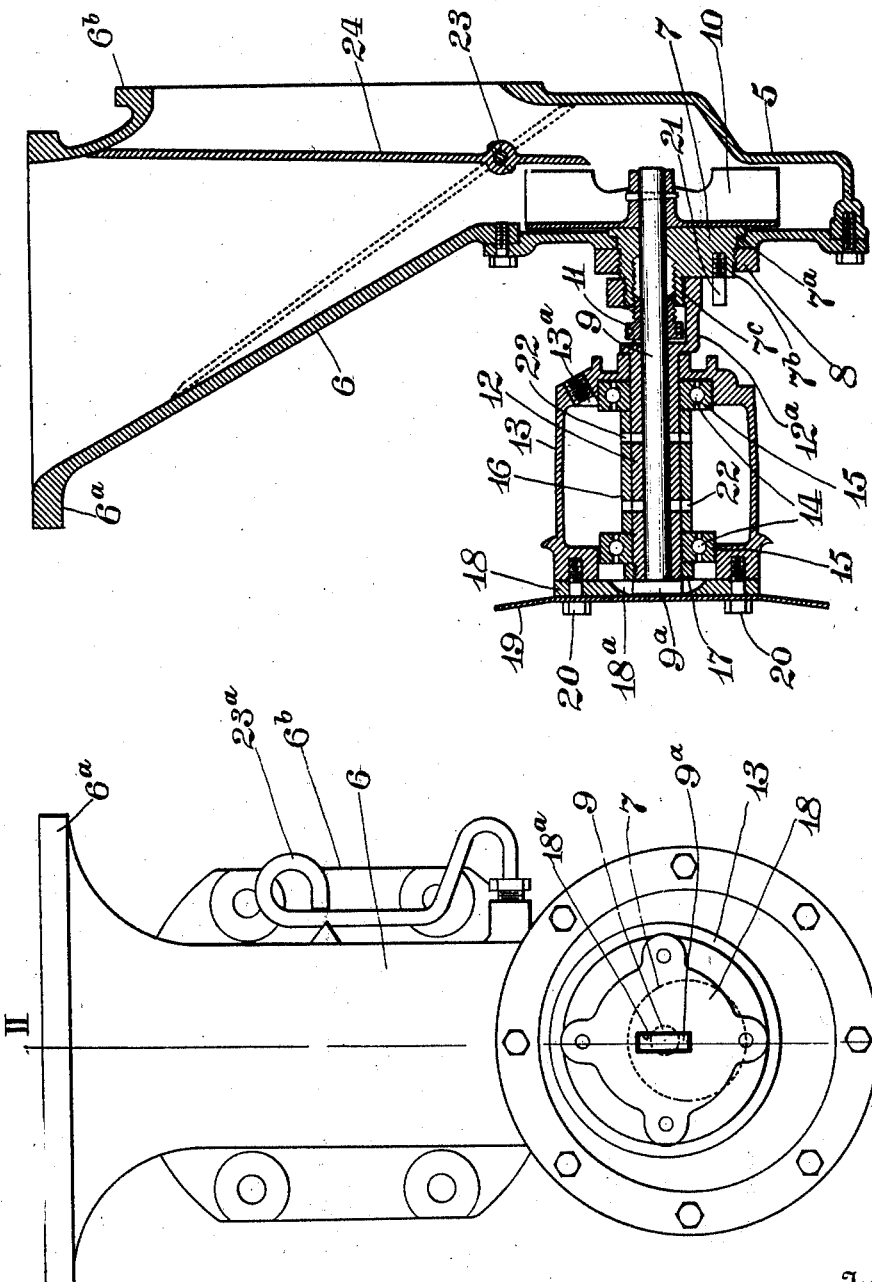
June 25, 1929. E. D. WITTMANN 1,718,675
PUMP FOR WATER COOLED ENGINES
Filed June 8, 1925
Inventor
EDWARD D. WITTMANN
his Attorneys Patented June 25, 1929.

UNITED STATES PATENT OFFICE.

EDWARD D. WITTMANN, OF COLUMBUS, OHIO.

PUMP FOR WATER-COOLED ENGINES.

Application filed June 8, 1925. Serial No. 35,588.

The embodiment of the invention herein shown is designed more especially for use in connection with the cooling system of the engine of the "Fordson" tractor as now marketed. The cooling system of the engine of that tractor, as marketed, is not equipped with a pump but depends on gravitational circulation resulting from the difference in temperature at the top and bottom of the body of water in the system. As a consequence of the extraordinarily heavy work often imposed on that tractor and the slow circulation of the water in the cooling system of the engine the latter frequently becomes over-heated. The object generally of the present invention, therefore, is to provide an economical pump adapted to be installed in said engine without materially altering its parts, interfering with other parts thereon and without impairing the efficiency of its ordinary operation. In carrying my invention into effect I utilize the Fordson fan belt pulley which, as distinguished from the corresponding element in the "Ford" automobile, is equipped with roller bearings.

The invention is embodied in the example herein shown and described the features of novelty being finally claimed.

In the accompanying drawing—

Figure 1 is a view in elevation of the forward end of the pump, the fan being omitted.

Fig. 2 is a vertical section on the line II—II Fig. 1 showing a fraction of the fan.

In the views 5 designates the pump chamber, a part of which is extended as a hollow connecting member 6. The upper open end of the connecting member 6 is provided with a flange $6^a$ for bolting said member to the radiator while its rear side is provided with an opening having a flange $6^b$ for bolting it to the engine so as to form, through said connecting member, a water passage from the engine to the radiator.

The forward wall of the pump chamber is provided with a large circular bearing in which fits and is journaled a circular shaft carrier 7 provided with a flange or shoulder $7^a$ at the inner side and a threaded portion $7^b$ at the outer end of the chamber wall, said threaded portion containing a jam nut 8 for binding the carrier in its adjusted position in said wall. The carrier 7 is eccentrically bored to receive the shaft 9 which has pinned to its end within the pump chamber the water impeller 10. The carrier 7 has a forwardly extended hollow boss $7^c$ threaded internally to receive a packing nut 11 and threaded externally to receive the threaded bracket $12^a$ of a sleeve 12.

The sleeve 12 has a shoulder at its rear portion and is threaded at its forward outer end. On this sleeve 12 is placed the fan belt pulley 13 of the Fordson tractor with its ball bearings 14, 14 including their races 15, but to hold these races in position on the sleeve 12 there is added a spacer sleeve 16 fitting on said sleeve and between the races. A nut 17 on the threaded forward end of the sleeve 12 confines the pulley to the sleeve 12 but so as to permit the pulley to rotate freely on that sleeve.

The shaft 9 is provided at its forward end with a rectangular or non-circular lug $9^a$ that extends into and fits snugly in a slot $18^a$ cut in the hub plate or pulley cap 18 of the usual fan 19. Said hub plate 18 and the fan 19 are bolted by the usual bolts 20 on the forward end of the fan belt pulley 13. The lug $9^a$ and hub plate 18 form the driving connection between the pulleys and impeller shaft.

In practice the fan belt is tightened or slacked as may be desired by turning in the appropriate direction the shaft carrier 7, the jam nut 8 being first loosened to permit such adjustment, after which said nut is tightened to fix the carrier in position. The carrier 7 is conveniently turned by inserting a lever, a screw driver for example, between the pin 21 and the bracket $12^a$ on the carrier and applying the necessary prying force thereto in the proper direction to tighten or slack the fan belt.

Lubricant supplied to the pulley through hole $13^a$ to lubricate the roller bearings therein also lubricates the impeller shaft through holes at 22 in the sleeves 12 and 16.

From the construction described it will be observed that the sleeve 12 constitutes the shaft around which the fan belt pulley rotates and that the power to drive the impeller shaft is imparted to said shaft through the fan hub plate 18 and lug $9^a$. Because the fan belt pulley turns around the stationary sleeve 12 no strain of the pulley is imposed on the impeller shaft 9 the latter turning freely in its long bearing in said sleeve 12.

Pivoted between the sides of the connecting member 6 is a shaft 23 to which is secured a valve 24 adapted to be thrown, as shown in full line position, to impel the flow of water to the pump chamber and through the cooling system; and, as shown in broken lines, to permit the usual or gravitational circulation resulting from the difference in temperature at the top and bottom of the body of water in the cooling system. The outer end of said shaft 23 externally of the connecting member is provided with a handle 23ª for shifting said valve to the position desired. But the construction respecting the valve constitutes the subject of another application for patent filed by me May 27, 1925, having S. No. 33,268.

The forms of the parts can be changed without departing from the gist of the invention as claimed and the principles of invention can be used in connection with the cooling system of engines other than that of the Fordson tractor.

What I claim is:

In combination with a pump chamber, a rockably mounted impeller shaft-carrier engaging the wall of the pump chamber at its interior side and having a threaded rim exposed at the exterior side of said wall, a jam nut on said threaded rim, an impeller shaft eccentrically journaled in said carrier, a sleeve having a bracket threaded on the aforesaid threaded rim, said sleeve surrounding the impeller shaft, a belt pulley carried by said sleeve, a fan having a hub plate bolted to said pulley and a driving connection between the belt pulley and the impeller shaft, said driving connection including a noncircular lug on the end of the impeller shaft engaging a similar socket in the hub of the fan.

EDWARD D. WITTMANN.